(12) United States Patent
Lee et al.

(10) Patent No.: US 8,794,411 B2
(45) Date of Patent: *Aug. 5, 2014

(54) POWERTRAIN PRESSURE CONTROL SYSTEM

(75) Inventors: Chunhao J. Lee, Troy, MI (US);
Chi-Kuan Kao, Troy, MI (US); Farzad Samie, Franklin, MI (US);
Kumaraswamy V. Hebbale, Troy, MI (US); Dongxu Li, Warren, MI (US);
Andrew L. Bartos, Clarkston, MI (US);
Kevin B. Rober, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 368 days.

This patent is subject to a terminal disclaimer.

(21) Appl. No.: 13/166,856

(22) Filed: Jun. 23, 2011

(65) Prior Publication Data

US 2012/0090952 A1 Apr. 19, 2012

Related U.S. Application Data

(60) Provisional application No. 61/393,382, filed on Oct. 15, 2010.

(51) Int. Cl.
*F16D 41/12* (2006.01)
*F16D 25/12* (2006.01)

(52) U.S. Cl.
USPC ............................. 192/43; 192/47; 192/85.63

(58) Field of Classification Search
None
See application file for complete search history.

(56) References Cited

U.S. PATENT DOCUMENTS

| | | | |
|---|---|---|---|
| 6,494,804 B1 | 12/2002 | Hunnicutt | |
| 6,540,203 B1 | 4/2003 | Hunnicutt | |
| 6,755,761 B2 | 6/2004 | Hunnicutt | |
| 8,272,488 B2* | 9/2012 | Eisengruber et al. | 192/46 |
| 8,393,344 B2* | 3/2013 | Hunnicutt | 137/1 |
| 2008/0169165 A1* | 7/2008 | Samie et al. | 192/43 |
| 2010/0018795 A1* | 1/2010 | Samie et al. | 180/383 |
| 2012/0090703 A1* | 4/2012 | Li et al. | 137/487.5 |
| 2012/0090945 A1* | 4/2012 | Lee et al. | 192/85.63 |
| 2012/0090946 A1* | 4/2012 | Lee et al. | 192/85.63 |
| 2012/0090947 A1* | 4/2012 | Lee et al. | 192/85.63 |
| 2012/0090948 A1* | 4/2012 | Lee et al. | 192/85.63 |

* cited by examiner

*Primary Examiner* — Richard M. Lorence
(74) *Attorney, Agent, or Firm* — Quinn Law Group, PLLC (57) ABSTRACT

A pressure control system configured to control a selectable one-way clutch (SOWC) includes a pilot valve and a SOWC actuator. The pilot valve is configured to produce a pilot signal and includes a first valve, which is a MEMS microvalve. The pressure control system may further include a regulating valve in fluid communication with the pilot valve and configured to receive the pilot signal. The regulating valve is further configured to output a control signal. The SOWC actuator is configured to select between operating modes of the selectable one-way clutch in response to one of the pilot signal and the control signal.

19 Claims, 5 Drawing Sheets

POWERTRAIN PRESSURE CONTROL SYSTEM

CROSS-REFERENCE TO RELATED APPLICATIONS

This application claims the benefit of U.S. Provisional Patent Application No. 61/393,382, filed Oct. 15, 2010, which is hereby incorporated by reference in its entirety.

TECHNICAL FIELD

This disclosure relates to hydraulic control of powertrains, transmissions, and the hydraulically-controlled components thereof.

BACKGROUND

Vehicle powertrains may include transmissions to transfer power and torque from an engine to the vehicle output (axles or wheels). Hybrid powertrains may include multiple primary movers, including internal combustion engines or alternative power sources, such as one or more electric machines coupled with an energy storage device. When the powertrain is equipped with an additional primary mover, such as an electric machine, the transmission may also transfer torque and power from the electric machine to provide traction for the vehicle. Fixed-gears or speed ratios allow the engine to operate within a narrow range of speeds while providing a wide range of output speeds to the powertrain.

Vehicles having either conventional internal combustion or hybrid gasoline/electric transmissions typically utilize a plurality of gear sets and a plurality of torque-transmitting devices know as clutches, which may include a selectable one-way clutch (SOWC) as one of the clutches. The gear sets and clutches, including the SOWC can be selectively engaged and disengaged alone or in various combinations to provide powertrain functionality. The SOWC is a torque transfer mechanism that is capable of producing a mechanical connection between a driving member of the transmission via a rotatable input race or a first coupling plate of the SOWC, and an independent driven member of the transmission via an output race or second coupling plate of the SOWC, in one or both rotational directions. A SOWC may overrun in one or both directions of rotation depending on its particular design. Typically, a SOWC contains a selector device, such as a selection ring or slide plate, the movement of which selects the operating mode of the SOWC. A control plunger or selection lever may be used to move the selection ring. The selection lever may be actuated by one or more hydraulic components, which may include a piston or other hydraulic actuator controlled by one or more valves linked to the hydraulic components. The hydraulic pressure regulated or provided by these valves actuates the movement of the selection lever and selection ring to actuate the selected SOWC operating mode.

SUMMARY

A pressure control system for a selectable one-way clutch (SOWC) is provided. The pressure control system includes a pilot valve and a SOWC actuator. The pilot valve includes a first valve, and is configured to produce a pilot signal which may be used to control the SOWC actuator. The first valve is a Micro Electro Mechanical Systems (MEMS) microvalve. The pressure control system may further include a regulating valve in fluid communication with the pilot valve. The regulating valve is configured to receive the pilot signal from the pilot valve and is configured to output a control signal, which controls the SOWC actuator.

The regulating valve may be a MEMS-based spool valve or may be a small mechanical spool valve. Furthermore, the pilot valve may further include a second valve, and the regulating valve may be a conventional mechanical regulating valve. The second valve may be a MEMS-based spool valve or may be a small mechanical spool valve.

The SOWC actuator is configured to select the operating mode of the selectable one-way clutch in response to a signal, which may be configured as one of a pilot signal and a control signal. The pressure control system may further include a MEMS pressure transducer configured to sense the pressure profile of one of the pilot signal and the control signal. A controller may be configured to receive input from the MEMS pressure transducer and to provide output to the pilot valve to regulate the system pressure in response to input from the MEMS pressure transducer.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
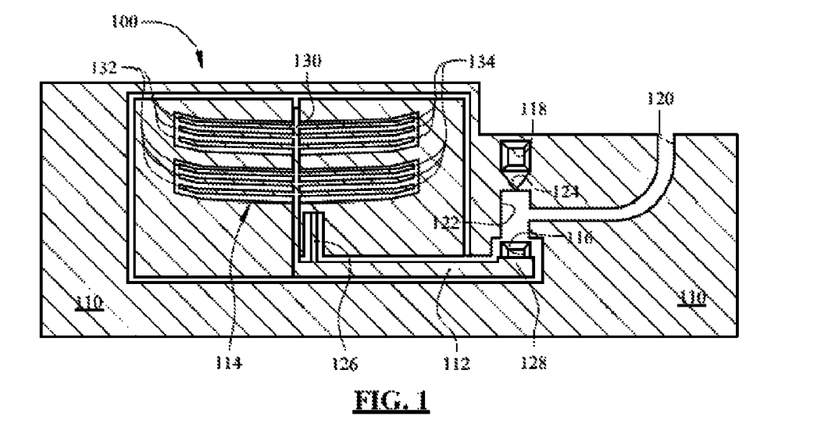
FIG. 1 is a schematic cross-sectional view of a Micro Electro Mechanical Systems (MEMS) microvalve actuator.

Referring to the drawings, wherein like reference numbers correspond to like or similar components throughout the several figures, there is shown in FIG. 1 a schematic cross-sectional view of a Micro Electro Mechanical Systems (MEMS) microvalve actuator 100. As discussed herein, the MEMS microvalve 100 may be used to effect hydraulic control over one or more hydraulic components, especially within a transmission. The MEMS microvalve 100 shown is only one type of MEMS device that may be used as a control valve or control actuator for the hydraulic components, and others, discussed herein. The MEMS microvalve 100 may also be referred to as a pressure differential actuator or a pilot direct actuating valve.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

Generally, MEMS may be considered a class of systems that are physically small, having features with sizes in the micrometer range. MEMS systems may have both electrical and mechanical components. MEMS devices are produced through micromachining processes. The term "micromachining" generally refers to the production of three-dimensional structures and moving parts through processes including modified integrated circuit (computer chip) fabrication techniques (such as chemical etching) and materials (such as silicon semiconductor material). The term "microvalve" as used herein generally refers to a valve having features with sizes in the micrometer range, and thus by definition is at least partially formed by micromachining The term "microvalve device" as used in this application means a device that includes a microvalve, and that may include other components. MEMS devices may be operating in conjunction with other MEMS (micromachined) devices or components or may be used with standard sized (larger) components, such as those produced by mechanical machining processes.

Referring to FIG. 1, the MEMS microvalve 100 includes a housing or body 110. The MEMS microvalve 100 may be formed from several material layers, such as semi-conductor wafers. The body 110 may also be formed from multiple layers. For example, and without limitation, the cross-sectioned portions shown may be taken through a middle layer of the MEMS microvalve 100, with two other layers existing behind and in front of (relative to the view in FIG. 1) the middle layer. The other layers of the body 110 may include solid covers, port plates, or electrical control plates. However each of the layers is generally considered part of the body 110, except where separately identified.

The MEMS microvalve 100 includes a beam 112 actuated by a valve actuator 114. Selective control of the actuator 114 causes the beam 112 to selectively alter the flow of fluid between an inlet port 116 and an outlet port 118. By varying the fluid flow between the inlet port 116 and the outlet port 118, the MEMS microvalve 100 varies the pressure in a pilot port 120. As described herein, the pilot port 120 may be connected to additional valves or devices and in order to effect hydraulic control thereof through a pilot signal which varies based upon the pressure in the pilot port 120.

The inlet port 116 is connected to a source of high-pressure fluid such as a pump (not shown). The outlet port 118 is connected to a low-pressure reservoir or fluid return (not shown). For purposes of the description herein, the outlet port 118 may be considered to be at ambient pressure, and acts as a ground or zero state in the MEMS microvalve 100.

The beam 112 moves in a continuously variable manner between a first position, illustrated in FIG. 1, a second position (not shown), and myriad intermediate positions. In the first position, the beam 112 does not completely block the inlet port 116. However, in the second position, the beam 112 blocks the inlet port 116 to prevent substantially all flow from the high-pressure fluid source.

A first chamber 122 is in fluid communication with both the inlet port 116 and the outlet port 118. However, communication between the outlet port 118 and the first chamber 122 (and also the inlet port 116) is restricted by an outlet orifice 124. High volume or fast fluid flow through the outlet orifice 124 causes a pressure differential to build between the first chamber 122 and the outlet port 118.

The beam 112 is pivotally mounted to a fixed portion of the body 110 by a flexure pivot 126. The opposite portion of the beam 112 from the flexure pivot 126 is a movable end 128 which moves up and down (as viewed in FIG. 1) to selectively and variably cover and uncover the inlet port 116.

When the beam 112 is in the second position, it allows little or no flow from the inlet port 116 to the first chamber 122. Any pressurized fluid in the first chamber 122 bleeds off through the outlet orifice 124 to the outlet port 118. As the beam 112 of the MEMS microvalve 100 is moved toward the first (open) position, the inlet port 116 is progressively uncovered, allowing faster flows of fluid from the inlet port 116 into the first chamber 122. The fast-flowing fluid cannot all be drained through the outlet orifice 124 and causes a pressure differential to form as the fluid flows through the outlet orifice 124, raising pressure in the first chamber 122.

As the inlet port 116 is further opened to the first position (as shown in FIG. 1), fluid gradually flows faster through the outlet orifice 124, causing a larger pressure differential and further raising the pressure in the first chamber 122. When the beam 112 is in the first position, it allows high flow from the inlet port 116 to the first chamber 122. Therefore, the pressure in the first chamber 122 can be controlled by controlling the rate of flow from the inlet port 116 through the first chamber 122 and the outlet orifice 124 to the outlet port 118. The position of the beam 112 controls the rate of flow of the fluid from the inlet port 116, and thus the pressure in the first chamber 122.

The valve actuator 114 selectively positions the beam 112. The actuator 114 includes an elongated spine 130 attached to the beam 112. The actuator 114 further includes a plurality of first ribs 132 and a plurality of second ribs 134, which are generally located on opposing sides of the elongated spine 130. Each of the first ribs 132 has a first end attached to a first side of the elongated spine 130 and a second end attached to the body 110. Similar to the first ribs 132, each of the second ribs 134 has a first end attached to the elongated spine 130 and a second end attached to the fixed portion of the body 110.

The elongated spine 130 and the first ribs 132 and the second ribs 134 may appear illustrated in FIG. 1 as disconnected from the body 110. However, the elongated spine 130, the first ribs 132, and the second ribs 134 are formed from the same material and are connected to the body 110 at some point in order to allow relative movement. However, the connection may be below the cross-sectioned plane shown in FIG. 1. Generally, the elongated spine 130, the first ribs 132, and the second ribs 134 may be considered the moving portions of the actuator 114.

The first ribs 132 and the second ribs 134 are configured to thermally expand (elongate) and contract (shrink) in response to temperature changes within the first ribs 132 and the second ribs 134. Electrical contacts (not shown) are adapted for connection to a source of electrical power to supply electrical current flowing through the first ribs 132 and the second ribs 134 to thermally expand the first ribs 132 and the second ribs 134.

The actuator 114 is adapted to be controlled by an electronic control unit (ECU) or other programmable device (not shown in FIG. 1) which supplies variable current to the first ribs 132 and the second ribs 134. As the first ribs 132 and the second ribs 134 expand due to sufficient current flow, the elongated spine 130 moves or stretches downward (as viewed in FIG. 1), causing the beam 112 to rotate in the generally counter-clockwise direction. The resulting movement of the beam 112 causes the moveable end 128 to move upward (as viewed in FIG. 1) and progressively block more of the inlet port 116.

Closing the inlet port 116 allows less (and eventually no) fluid to flow into the first chamber 122, decreasing the pressure therein as the fluid drains to the outlet port 118. Once the inlet port 116 is closed, the MEMS microvalve 100 is in the second position (not shown), and no pilot signal is being communicated through the pilot port 120.

As the flow of current drops, the first ribs 132 and the second ribs 134 contract and the elongated spine 130 moves upward (as viewed in FIG. 1), causing the beam 112 to rotate in the generally clockwise direction. The resulting movement of the beam 112 causes the moveable end 128 to move downward (as viewed in FIG. 1) and progressively open more of the inlet port 116.

Opening the inlet port 116 allows more fluid to flow into the first chamber 122, increasing the pressure therein as the fluid flow overcomes the ability of the outlet port 118 to drain fluid from the first chamber 122. Once the inlet port 116 is substantially open, the MEMS microvalve 100 is in the first position (shown in FIG. 1), and a strong pilot signal is being communicated through the pilot port 120.

In addition to the heat-actuated MEMS device shown in FIG. 1, other types of MEMS based actuators may be used in place of the MEMS microvalve 100 or in place of the actuator 114. In general, the MEMS based device may include any device that has one or more electronic elements fabricated through an integrated circuit technique (e.g., etching on a silicon wafer) and one or more mechanical elements fabricated through a micromachining process (e.g., forming structures and moving parts with dimensions in the micrometer range). The electronic and mechanical elements may also be formed by other processes. In alternative or additional approaches, configurations, or embodiments, the MEMS-based device may include other elements with dimensions in the micrometer range, such as an electromagnetic field actuator, a piezoelectric amplifier, a thermal actuator, a pressure sensor, a gyroscope, an optical switch, other MEMS-based devices, or any combination thereof.

Figure 2:
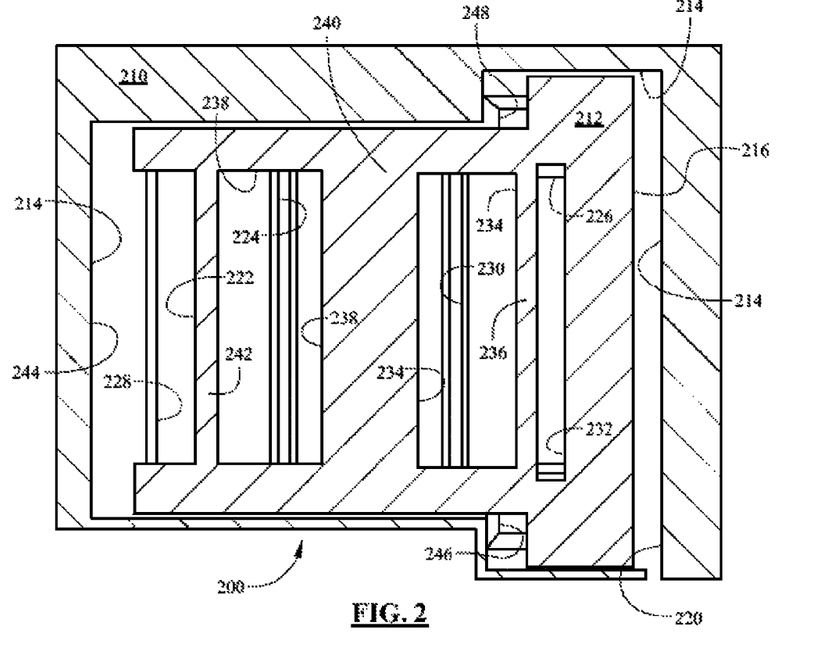
FIG. 2 is a schematic cross-sectional view of a MEMS spool valve which may be used alone or in conjunction with the MEMS microvalve actuator shown in FIG. 1.

Referring now to FIG. 2, and with continued reference to FIG. 1, there is shown a schematic cross-sectional view of a MEMS-based spool valve 200. The MEMS-based spool valve 200 includes a housing or body 210. The MEMS-based spool valve 200 may be formed from several material layers, such as semi-conductor wafers. The body 210 may also be formed from multiple layers. For example, and without limitation, the cross-sectioned portions shown may be taken through a middle layer of the MEMS-based spool valve 200, with two other layers existing behind and in front of (relative to the view in FIG. 2) the middle layer.

The MEMS-based spool valve 200 includes a slider 212 configured to be movable to the left and to the right (as viewed in FIG. 2) within a cavity 214 defined by the body 210. The slider 212 is actuated by fluid pressure on a piloted surface 216, which is in fluid communication with a piloted chamber 220 of the cavity 214. Selective variation of pressure within the piloted chamber 220 alters the force applied to the piloted surface 216. The piloted chamber 220 may be in fluid communication with a pilot signal, such as the pilot signal produced by the pilot port 120 of the MEMS microvalve 100 shown in FIG. 1.

The slider 212 is formed with an elongated plate having a pair of oppositely disposed arms extending perpendicularly at a first end of the body so that the slider 212 is generally a T-shape, having the piloted surface 216 at a wider longitudinal end of the slider 212, and a counter surface 222 at a relatively narrower opposing longitudinal end of the slider 212. The cavity 214 is also generally a T-shape.

The body 210 defines a number of ports connecting with the cavity 214, some of which may be formed in cross-sectioned layer and some of which may be formed in other layers. The ports include a supply port 224, which is adapted to be connected to a source of high pressure fluid, such as a transmission pump (not shown). The supply port 224 may be connected to the same source of high-pressure fluid as the inlet port 116 of the MEMS microvalve 100 shown in FIG. 1. The body 210 also defines a tank port 226, which is connected to a low-pressure reservoir or fluid return (not shown). The tank port 226 may be connected to the same source of low-pressure fluid as the outlet port 118 of the MEMS microvalve 100 shown in FIG. 1.

A first load port 228 and a second load port 230 are formed in the body and communicate with the cavity 214. The first load port 228 and the second load port 230 are disposed on opposite sides of the supply port 224. The first load port 228 and the second load port 230 are adapted to be connected together to supply pressurized fluid to a hydraulically-operated component of the transmission or powertrain, as described herein. Additional ports, channels, or troughs (not viewable in FIG. 2) may be formed on the upper surface of the cavity 214 opposite the first load port 228 and the tank port 226. The additional troughs help balance flow forces acting on the slider 212.

The slider 212 shown includes three openings therethrough. A first opening 232, close to the piloted surface 216, is defined through the slider 212 to permit the fluid volume to equalize through the trough above the tank port 226 with the pressure at the tank port 226, balancing forces acting vertically (into and out of the view shown in FIG. 2) on the slider 212. A second opening 234 through the slider 212 forms an internal volume that is always in communication with the second load port 230.

A web 236 between the second opening 234 and the first opening 232 permits or prevents flow between the second load port 230 and the tank port 226 depending upon the position of the slider 212. In the illustrated position, the web 236 prevents flow between the second load port 230 and the tank port 226. When the web 236 moves to the right (as viewed in FIG. 2), a fluid pathway between the second load port 230 and the tank port 226 is opened, venting any pressure present at the second load port 230 to the low pressure reservoir connected to the tank port 226.

A third opening 238 through the slider 212 permits the fluid volume in the trough above the first load port 228 to equalize with the pressure at the first load port 228, balancing forces acting vertically (into and out of the view shown in FIG. 2) on the slider 212. A web 240 between the second opening 234 and the third opening 238 prevents flow between the supply port 224 and the second load port 230 in all positions of the slider 212.

A web 242 between the third opening 238 and the counter surface 222 permits or prevents flow between the supply port 224 and the first load port 228, depending upon the position of the slider 212. In the illustrated position, the web 242 prevents flow between the supply port 224 and the first load port 228. When the slider 212 moves to the left (as viewed in FIG. 2), a fluid pathway opens between the supply port 224 and the first load port 228, supplying pressurized fluid to the load connected to the first load port 228.

The slider 212 cooperates with the walls of the cavity 214 to define the piloted chamber 220 between the piloted surface 216 and the opposing wall of the cavity 214. A counter chamber 244 is defined between the counter surface 222 and the opposing wall of the cavity 214. The counter chamber 244 is in fluid communication with the first load port 228 at all times. Additionally, two volumes 246 and 248 may be defined between respective pairs of shoulders of the T-shaped plate forming the slider 212 and the shoulders of the T-shaped cavity 214. The volumes 246 and 248 are in communication with the tank port 226 at all times. In this manner, a hydraulic lock of the slider 212 is prevented.

The total area of the piloted surface 216 of the slider 212 is larger than the total area of the counter surface 222 of the slider 212. Therefore, when the pressures in the piloted chamber 220 and the counter chamber 244 are equal, the resultant unbalanced net force acting on the slider 212 will urge the slider 212 to the left (as viewed in FIG. 2).

The exact configuration of the ports and openings shown in the MEMS-based spool valve 200 and the slider 212 is not required. The MEMS-based spool valve 200 is configured to receive a relatively-small pilot signal, such as the pilot signal from the MEMS microvalve 100, and output a stronger signal (either for control or further piloting). When referring to fluidic signals, such as the pilot signal received by the MEMS-based spool valve 200, the term small may generally refer to relatively low flow volumetric flow. Therefore, the MEMS-based spool valve 200 amplifies the pilot signal and allows the pilot signal to control or pilot devices requiring higher flow or higher pressure than provided by the pilot signal alone.

Figure 3A:
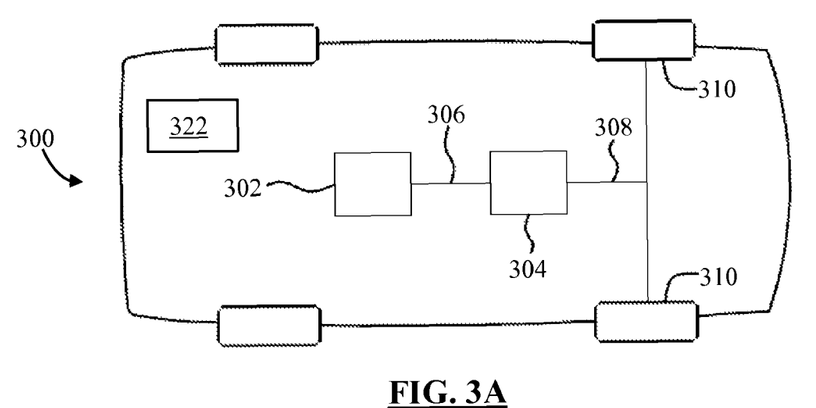
FIG. 3A is a schematic diagram of a vehicle having a powertrain including a selectable one-way clutch (SOWC), into which one or more pressure control systems may be incorporated.
Figure 3B:
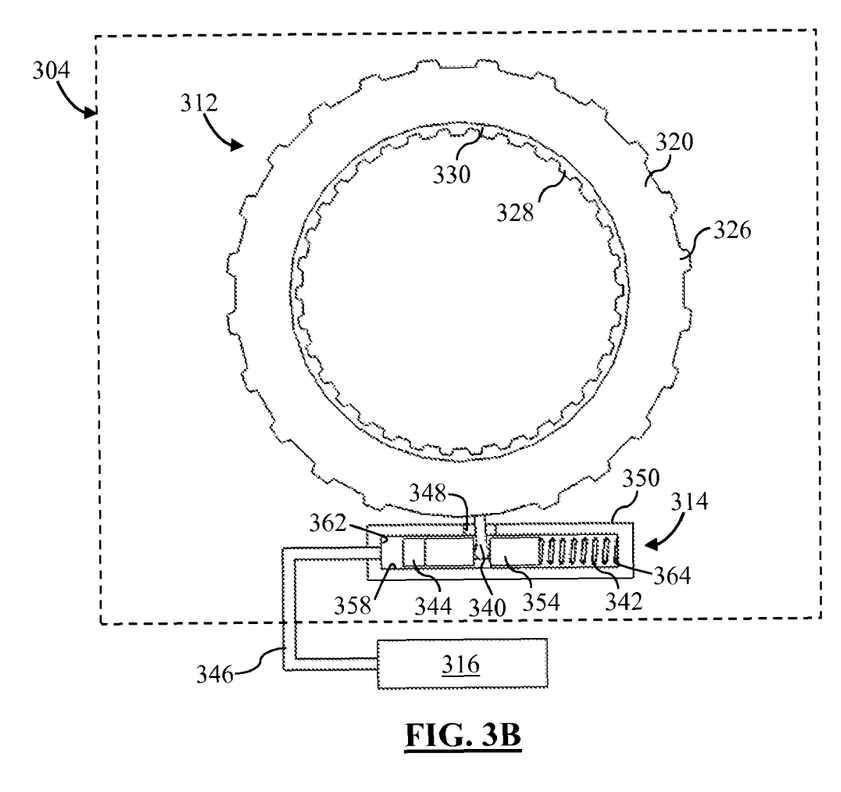
FIG. 3B is a cutaway schematic partial cut-away side-view diagram of the selectable one-way clutch, which is directly controlled by a pressure control system.
Figure 3C:
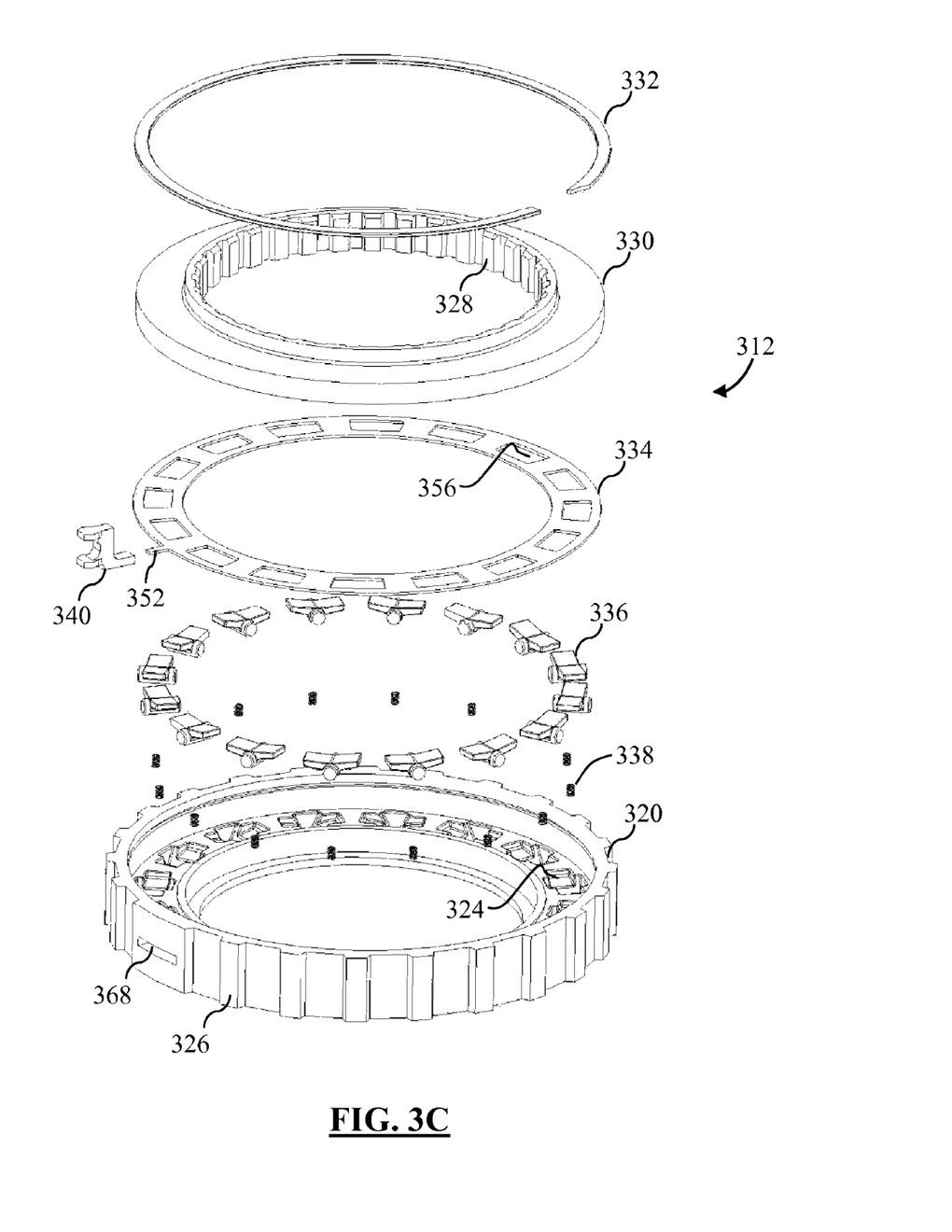
FIG. 3C is a exploded schematic illustration of components of the selectable one-way clutch.

Referring now to FIG. 3A, FIG. 3B, and FIG. 3C, and with continued reference to FIGS. 1-2, there are shown elements of a vehicle 300 including a powertrain which may incorporate some of the pressure control systems described herein. FIG. 3A shows a schematic diagram of the vehicle 300 having a powertrain comprising an engine 302 and a transmission 304. The engine 302 may be configured, by way of non-limiting example, as a gasoline, diesel, or alternative fuel internal combustion engine, or a fuel cell or battery-powered electric motor, or another alternative power source to the conventional internal combustion engine. The engine 302 is selectively or continuously connected to an automatic transmission 304 by an input member or rotatable shaft 306. The transmission 304 includes a plurality of torque-transmitting mechanisms including a selectable one-way clutch (SOWC) 312 (see FIGS. 3B and 3C), a plurality of gear sets and an output member or rotatable shaft 308. The transmission 304 transmits a rotational force or torque to the output member 308, which ultimately propels the vehicle 300 via a set of road wheels 310.

A controller 322, as shown in FIG. 3A, may control actuation of components of the powertrain of the vehicle 300, including selection of the operating mode of the gears and clutches of the transmission 304. The controller may include multiple devices and may include distributed controller architecture, such as a microprocessor-based electronic control unit (ECU). The controller 322 may include one or more components with a storage medium and a suitable amount of programmable memory, which are capable of storing and executing one or more algorithms or methods to effect control of the powertrain of vehicle 300 or components thereof. Furthermore, the controller 322 may be configured to provide the electric current which selectively and variably actuates the MEMS microvalve 100 shown in FIG. 1.

FIG. 3B shows a cutaway schematic side view diagram of the SOWC 312, in which a SOWC actuator 314 is controlled by a pressure control system 316. A SOWC, such as SOWC 312 shown in FIGS. 3B and 3C, is a torque transfer mechanism that is capable of producing a mechanical connection between a driving member of the transmission (not shown) in operative contact with a driving member 330 of the SOWC 312, and an independent driven member of the transmission (not shown) in operative contact with a driven member 320 of the SOWC 312, in one or both rotational directions. The driving member 330 of the SOWC 312 may be configured, for example, as a rotatable input race or a first coupling plate of the SOWC 312, and may be referred to herein as a driving member, an input race, a first coupling plate and/or a notch plate. The independent driven member 320 of the SOWC 312 may be configured, for example, as an output race or second coupling plate of the SOWC 312, and may be referred to herein as a driven member, an output race, a second coupling plate and/or a strut plate. The SOWC 312 may overrun in one or both directions of rotation depending on its particular design.

The SOWC 312 is disposed or positioned within a housing or case (not shown) of the transmission 304 of FIG. 3A. The driving member 330 and the driven member 320 of the SOWC 312 each have a centerline or axis of rotation in common with the transmission 304. The driven member 320 of the SOWC 312, which may also be referred to as the output race, the strut plate or the pocket plate, may be indexed to, affixed or grounded to the transmission case, for example, by using a plurality of splines 326 in proximate contact with a plurality of mating splines in the transmission case (not shown). The driving member 330 of the SOWC 312, which may also be referred to as the input race or the notch plate, is connected to a carrier member of a gear set (not shown) of the transmission 304, for example, via the spline 328, such that the SOWC 312 can selectively transmit torque between the driving member 330 and the driven member 320 in one rotational direction by moving a selector plate or slide plate 334 positioned between the members 320, 330 of the SOWC 312. Reversing the direction of rotation of the driving member 330 without changing the position of the selector plate 334 in turn enables the driving member 330 to freewheel with respect to the driven member 320.

The SOWC 312 contains a selection mechanism or actuator 314 which includes a hydraulically actuated member which may be configured, for example, as a piston 344, such that the SOWC 312 is a hydraulically actuated component of the transmission 304. The actuator 314 controls the movement of a selection lever 340, which is operatively connected to the selector plate 334. The selection lever 340, which may also be referred to as a control plunger, may be actuated to move the selector plate 334 to a position corresponding to the selected operating mode. The SOWC 312 may used rollers, sprags, rockers, struts, such as the struts 336 shown in FIG. 3C, or another suitable torque-transmitting element, a plurality of which are positioned between the input and output races 330, 320, to provide the mechanical means to lock the SOWC 312 in a selected operating mode.

The SOWC actuator 314, and the hydraulically actuated member therein, e.g., the piston 344, is controlled by a pressure control system 316 which may include one or more valves, such as the microvalve 100 shown in FIG. 1. The pressure control system 316 actuates the actuator 314 to cause the movement of the selection lever 340 to rotate the selector plate 334 to define the operating mode of the SOWC 312. Options for the pressure control system 316 are shown in FIGS. 4-8. One or more additional pressure control systems 316 may be incorporated into the transmission 304, the SOWC 312, or other components or systems of the powertrain 300.

FIG. 3C shows an exploded schematic illustration of the selectable one-way clutch 312. The strut plate 320, notch plate 330 and selector plate 334 are co-annular, with the selector plate 334 interposed as a slide plate between the driven strut plate 320 and the driving notch plate 330. The strut plate 320 has a pocket-shaped design including a first side defining a plurality of pockets 324 and having a race into which the selector plate 334 and the notch plate 330 are assembled and held in place preferably using a snap ring 332. The strut plate 320 includes a pass-through slot portion 368 formed therein. A lever 340, which may also be referred to as a selection lever or shift lever, passes through the slot 368 and is operatively engaged with an extension or tab 352 defined by the selector plate 334, such that the lever 340 is slidably moveable in the slot 368. The strut plate 320 includes a plurality of struts 336 and springs 338 located in the strut pockets 324 located circumferentially within the pocket area of the first side of the strut plate 320. The plurality of struts 336 are spring-actuated by springs 338 and selectively retractable in the strut pockets 324. The notch plate 330 includes a plurality of circumferentially located notches (not shown) located co-annular to the retractable struts 336 in the strut plate 320.

The selector plate 334 is configured to slidably move in the annular race of the strut plate 320, rotating about the common axis of the strut plate 320, the notch plate 330 and the selector plate 334. The selector plate 334 includes a plurality of pass-through notch openings 356 corresponding to the retractable struts 336 of the strut plate 320 and the notches of the notch plate 330. The selector plate 334 includes an extension or tab 352 that passes through the slot portion 368 of the strut plate 320, to connectively engage the lever 340. The magnitude of the rotatably slidable movement of the selector plate 334 is circumscribed by the movement of the lever 340 and the slot 368 of the strut plate 320.

When the lever 340 is actuated by the SOWC actuator 314 to slidably rotate the selector plate 334 to a first position with respect to the strut plate 320, the notch openings 356 of the selector plate 334 restrain the retractable struts 336 such that the notch plate 330 rotates freely with the carrier member in a first rotational direction, for example, a forward direction, but is braked in the opposite rotation direction, for example, the reverse direction. When the lever 340 is actuated by the SOWC actuator 314 to slidably rotate the selector plate 334 to a second position with respect to the strut plate 320, the notch openings 356 of the selector plate 334 restrain the retractable struts 336 such that the notch plate 330 rotates freely with the carrier member in a second rotational direction, for example, a reverse direction, but is braked in the opposite rotation direction, for example, the forward direction. When the lever 340 is actuated by the SOWC actuator 314 to slidably rotate the selector plate 334 to a third position with respect to the strut plate 320, the notch openings 356 of the selector plate 334 restrain the retractable struts 336 such that the notch plate 330 rotates freely with the carrier member in either rotational direction. Other configurations of the SOWC 312 are possible, for example, the selector plate 334 and the struts 336 may be configured such that the selector plate 334 is moved to another position by lever 340 wherein the struts 336 protrude through the notch openings 356 to engage the notches (not shown) of the notch plate 330 to fixedly lock the notch plate 330 to the strut plate 320, stopping the carrier member from rotating in either direction. As would be understood, the SOWC may be configured as a two-way SOWC, where the lever 340 is moved between a first position and a second position, each position corresponding to one of the two operating modes of the two-way SOWC. The SOWC may be configured as a three-way SOWC, where the lever 340 is moved between a first, second and third position, the third position being, for example, an intermediate position between the first and second positions, each position corresponding to one of the three operating modes of the three-way SOWC.

FIG. 3B shows a cutaway perspective view to show internal detail of the SOWC actuator 314. The actuator 314 is actuated to move the lever 340 from one position to another based upon a pilot or control signal from a control line 346. The control signal is communicated from the pressure control system 316 (options for which are described in more detail herein). Depending upon the configuration of the SOWC 312 and the actuator 314, the pilot or control signal from control line 346 may be an on/off signal, which has no intermediate states between a first position and a second position, to control, for example, a two-way SOWC. The signal from control line 346 may be a regulated signal, which allows positioning of the selector plate 334 in an intermediate position in addition to the first and second positions, to control, for example, a three-way SOWC. The intermediate position, which may be a third position, may correspond to an operating mode whereby the driving member 330 may either rotate freely in either direction, or be fixedly locked in both directions, depending on the configuration of the three-way SOWC 312.

The actuator 314 includes a housing 350 which defines a bore 358 having a first or piston end 362 containing an apply piston 344, and a second or spring end 364 containing a return spring 342. The piston 344 and spring 342 are in direct continuous contact with an actuator linkage 354, which is operatively connected to the shift lever 340, and ultimately to the selector plate 334 of the SOWC 312, as shown in FIGS. 3B and 3C. Shift lever 340 protrudes through an opening 348 in housing 350, and as previously discussed, passes through a slot 368 to operatively connect to the selector plate 334 such that movement of the end of lever 340 by the actuator linkage 354 linearly in bore 358 causes an axial rotation of the selector plate 334.

When actuated by a control signal from a control line 346, pressurized fluid from the control line 346 moves the piston 344 and actuator linkage 354 in the bore 358 in the direction of the spring end 364 of the housing 350, compressing the return spring 342, and moving the lever 340 from a first position to a second position. When the control signal from the pressure control system 316 is discontinued, e.g., when the fluid pressure supplied by the control line 346 decreases, the return spring 342 pushes or moves the actuator linkage 354 and the piston 344 in the bore 358 in the direction of the piston end 362 of the housing 350, and thereby moves the lever 340 from the second position to the first position.

As would be understood, the first position and the second position, as each corresponds to an operating mode of the SOWC, would depend upon the configuration of the SOWC and the associated transmission, e.g., in one SOWC/transmission configuration, the first position may correspond, for example, to rotation in a forward direction and braking in a reverse direction; in another SOWC/transmission configuration, the second position may correspond to, for example, rotation in a forward direction and braking in a reverse direction. Depending upon the configuration of the SOWC 312 and the actuator 314, the control signal may be a regulated signal, such that the control pressure provided by the control line 346 is regulated to maintain the lever 340 and thereby the selector plate 334 in an intermediate position which may correspond, for example, to movement of the piston 344 and compression of the spring 342 to an intermediate condition between the first and second positions, for example, to allow the notch plate 330 of the SOWC to freewheel in both directions or to be fixedly locked in both directions, depending on the configuration of the SOWC 312.

Referring now to FIGS. 4-8, and with continued reference to FIGS. 1-3C, there are shown schematic box diagrams of options for pressure control systems for selectable one-way clutches, such as the selectable one-way clutches 314 shown in FIGS. 3A, 3B, and 3C. Each of the plurality of options for pressure control systems shown and described may be used for operation and control of the selectable one-way clutch 312 through the SOWC actuator 314. Each of the options may be substituted into the pressure control system 316 diagrammatically shown in FIG. 3B.

Figure 4:
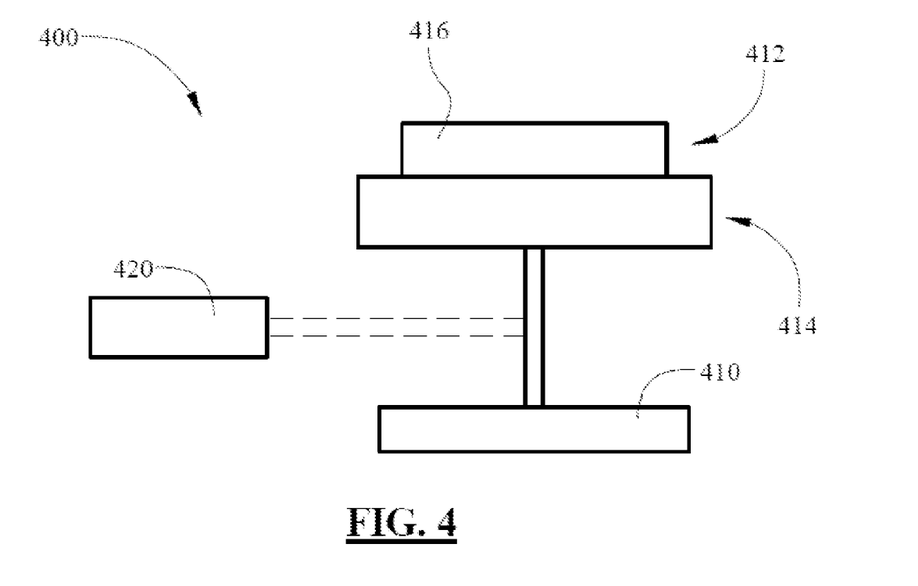
FIG. 4 is a schematic box diagram of a first option for a pressure control system for a hydraulically-controlled component within the powertrain.

FIG. 4 shows a first option 400 for a pressure control system for a hydraulically-controlled component 410 within the powertrain of the vehicle 300 including but not limited to the transmission 304. The hydraulically-controlled component 410 may be the SOWC 312 including the SOWC actuator 314 configured as shown in FIGS. 3B and 3C, or may be a differently configured SOWC and/or differently configured SOWC actuator. The first option 400 includes a pilot valve 412 controlling a regulating valve 414. The regulating valve 414 is in fluid communication with the pilot valve 412. The pilot valve 412 includes a first valve 416 producing a pilot signal. The regulating valve 414 is configured to receive the pilot signal and the regulating valve 414 is configured to output a control signal which controls the hydraulically-controlled component 410.

In the first option 400 shown in FIG. 4, the first valve 416 may include the MEMS microvalve 100 shown in FIG. 1, and the regulating valve 414 may include the MEMS-based spool valve 200. Therefore, as described herein, the MEMS microvalve 100 produces the pilot signal and communicates through the pilot port 120 to the piloted chamber 220 of the MEMS-based spool valve 200. The MEMS microvalve 100 shown defaults to the open position, which may be referred to as a "normally high" valve. Alternatively, the MEMS microvalve 100 may be configured closed by decreasing the electric current supplied to the actuator 114, such that the MEMS microvalve 100 would default to the closed position, which may be referred to as a "normally low" valve.

As shown in FIGS. 1 and 2, when the MEMS microvalve 100 shown in FIG. 1 is combined with the MEMS-based spool valve 200, either by attaching the two directly together or by fluidly connecting the pilot port 120 and piloted chamber 220, the MEMS microvalve 100 acts on the MEMS-based spool valve 200 to alter the fluid flow and pressure to the first load port 228 and the second load port 230.

The inlet port 116 in the MEMS microvalve 100 is relatively small in comparison to the supply port 224 and the first load port 228 of the MEMS-based spool valve 200. In combined operation, the beam 112 of the MEMS microvalve 100 uncovers the inlet port 116, and fluid flows through the inlet port 116, the first chamber 122, and the outlet orifice 124 to the outlet port 118. The inlet port 116 may act as an additional orifice in this flow path.

Due to possible pressure drop through the inlet port 116, it may not be possible to get the pressure in the piloted chamber 220 of the MEMS-based spool valve 200 up to the pressure provided by the high-pressure fluid source. The pressure in the counter chamber 244 may achieve a higher pressure (at or near pump outlet pressure) than may be achieved in the piloted chamber 220, owing to the larger openings of the supply port 224 and the first load port 228 of the MEMS-based spool valve 200, and resultant low pressure drop when fluid flows through these ports. However, because the surface area of the piloted surface 216 is greater than the surface area of the counter surface 222, the slider 212 can still be moved leftward (as viewed in FIG. 2) even if the pressure in the piloted chamber 220 acting on the piloted surface 216 is less than the pressure in the counter chamber 244.

The MEMS-based spool valve 200 has three principal zones or positions of operation: a pressure increase position, a pressure hold position, and a pressure decrease position. The MEMS-based spool valve 200 is shown in FIG. 2 in the pressure hold position, such that the MEMS-based spool valve 200 is holding pressurized fluid on the hydraulically-controlled component 410 (the load).

If the slider 212 is moved rightward (as viewed on the page in FIG. 2), the MEMS-based spool valve 200 is in the pressure decrease position. This is accomplished when the controller 322 commands the MEMS microvalve 100 to close, by increasing electric current supplied to the actuator 114. The first and second ribs 132 and 134 of the actuator 114 expand, causing the beam 112 to pivot counter-clockwise (bending the flexure pivot 126) and cover more of the inlet port 116. Flow decreases through the first chamber 122 from the inlet port 116 to the outlet port 118. The pressure drop across the outlet orifice 124 decreases.

Pressure in the first chamber 122 and the pilot port 120 also decreases. Because the pilot port 120 is in direct fluid communication with the piloted chamber 220, this results in an imbalance of the forces acting on the slider 212. The decreased force acting on the piloted surface 216 (due to the lowered pressure in the piloted chamber 220) is now less than the unchanged force acting on the counter surface 222 due to the pressure in the counter chamber 244 (connected to the load).

The force imbalance urges the slider 212 of the MEMS-based spool valve 200 to the right (as viewed on the page in FIG. 2). The web 236 is thus moved rightward, permitting flow of pressurized fluid from the hydraulically-controlled component 410, through the second load port 230 and through the second opening 234 in the slider 212. From there, some of the flow passes directly out of the tank port 226, while some flow may pass up into the trough above the tank port 226, over the top of the web 236, down through the first opening 232 and out the tank port 226. In this manner, pressure is released from the hydraulically-controlled component 410 and vented to the low pressure reservoir connected to the tank port 226.

The slider 212 of the MEMS-based spool valve 200 will move back to the pressure hold position when the pressure in the counter chamber 244 (acting through the first load port 228) is decreased sufficiently that forces acting on the slider 212 urge the slider 212 leftward (as viewed on the page in FIG. 2). With forces equalized, the slider 212 of the MEMS-based spool valve 200 will stop in the pressure hold position. Thus, the pressure at the load (as sensed through the first load port 228 and the second load port 230) will be proportionate to the electrical signal (current) supplied to the actuator 114.

To move the MEMS-based spool valve 200 into the pressure increase position, the controller 322 decreases current flow through the ribs 132, 134 of the actuator 114 and the beam 112 of the MEMS microvalve 100 pivots clockwise to uncover more of the inlet port 116. This results in a pressure increase in the piloted chamber 220, while the pressure in the counter chamber 244 remains constant. The slider 212 is moved leftward (as viewed on the page in FIG. 2) due to the resultant imbalance of forces acting on the slider 212. If the MEMS-based spool valve 200 was in the pressure decrease position, the leftward movement moves the slider valve back to the pressure hold position shown in FIG. 2.

If the controller 322 further decreases current flow and causes the MEMS microvalve 100 to open further, the pressure in the piloted chamber 220 further increases, urging the slider 212 of the MEMS-based spool valve 200 further leftward (as viewed on the page in FIG. 2) into the pressure increase position. The web 242 is moved leftward, permitting flow of pressurized fluid from the supply port 224 through the third opening 238 in the slider 212. From the third opening 238, some of the flow passes directly out of the first load port 228, while some flow may pass up into the trough over the top of the web 242, through the second counter chamber 244 and out of the first load port 228. In this manner, pressure is directed from the source of high-pressure fluid connected to the supply port 224 and applied to the load connected to the first load port 228 (e.g., the hydraulically-operated component 410).

The control signal produced by the MEMS-base spool valve 200 may have sufficient pressure and flow characteristics to control the hydraulically-controlled component 410 with a relatively-short response time. The pilot signal produced by the MEMS microvalve 100 may be able to directly control the hydraulically-controlled component 410. However, the response times from directly controlling the hydraulically-controlled component 410 with the MEMS microvalve 100 may be relatively slower than when combined with the MEMS-based spool valve 200 or another amplifying valve (through increases in flow).

As also shown in FIG. 4, the first option 400 may further include a MEMS pressure transducer 420. The MEMS pressure transducer 420 is optional. However, when used, the MEMS pressure transducer 420 is configured to sense the pressure profile of the control signal from the regulating valve 414. The controller 322, or other control device, may be configured to receive input from the MEMS pressure transducer 420 and to provide output to the MEMS microvalve 100 in the pilot valve 412 to regulate the system pressure in response to input from the MEMS pressure transducer 420. Therefore, with the MEMS pressure transducer 420 and the controller, the first option 400 may be configured for closed-loop feedback and adjustment of the control signal sent to the hydraulically-controlled component 410.

The hydraulically-controlled component 410 may be the SOWC 312 including the SOWC actuator 314 configured as shown in FIGS. 3B and 3C, or may be a differently configured SOWC and/or differently configured SOWC actuator. For example, and without limitation, the control signal from the regulating valve 414 may be sent directly to the SOWC actuator 314 through the control line 346 (as illustrated in FIG. 3B). Alternatively, the control signal sent to the hydraulically-controlled component 410 may be adjusted by the MEMS pressure transducer 420 such that the control signal may also be used to control the piston and spring positions in the actuator 314 to maintain the shift lever 340 in an intermediate position corresponding to a selected operating mode of the SOWC 312. In this alternative, the pressure transducer 420 may be configured as a pressure switch 420 to enable the actuation of an intermediate position of the shift lever 340 and the corresponding operating mode of the SOWC 312. In either configuration, the SOWC actuator 314 controls engagement and disengagement of the selectable one-way clutch 312 based upon the control signal from the regulating valve 414, which is produced in response to the pilot signal from the pilot valve 412.

Figure 5:
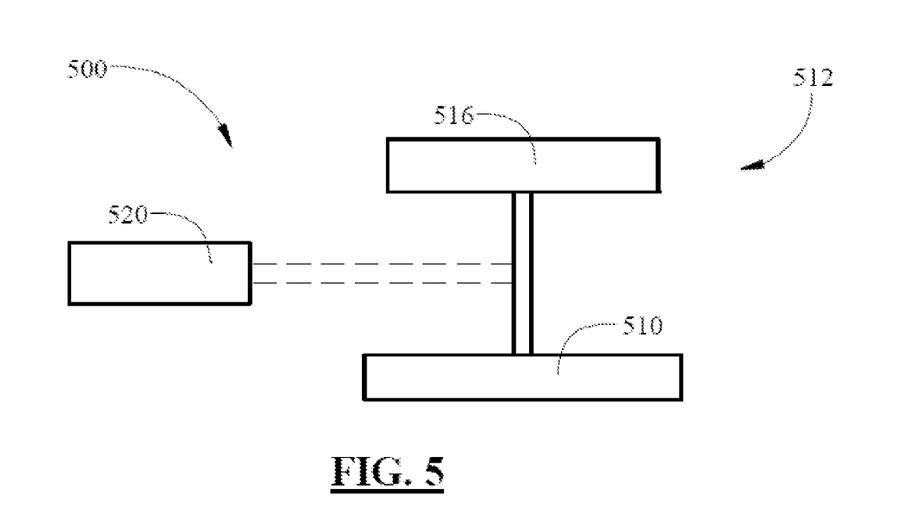
FIG. 5 is a schematic box diagram of a second option for a pressure control system for the hydraulically-controlled component within the powertrain.

FIG. 5 shows a second option 500 for a pressure control system for a hydraulically-controlled component 510 within the powertrain of the vehicle 300, including the transmission 304. The hydraulically-controlled component 510 may be the SOWC 312 including the SOWC actuator 314 configured as shown in FIGS. 3B and 3C, or may be a differently configured SOWC and/or differently configured SOWC actuator. The second option 500 includes a pilot valve 512 configured as a single valve 516 producing a pilot signal. The pilot valve 512 is in fluid communication with the hydraulically-controlled component 510. The pilot valve 512 is dual purposed as both the pilot valve and the regulating valve, and the pilot signal provided by the pilot valve 512 is therefore used as the control signal which controls the hydraulically-controlled component 510.

In the second option 500 shown in FIG. 5, the pilot/control valve 516 may include the MEMS microvalve 100 shown in FIG. 1. Therefore, as already described herein, the MEMS microvalve 100 selectively produces the pilot signal and communicates through the pilot port 120 to the hydraulically-controlled component 510. In this instance, the pilot signal produced by the pilot valve 512 (including only the MEMS microvalve 100), may have sufficient pressure and flow characteristics to control the hydraulically-controlled component 510 with relatively quick response times, such that the pilot signal may be used directly as the control signal, and eliminating the need for an intermediate regulating valve to amplify the pilot signal into a control signal.

As also shown in FIG. 5, the second option 500 further includes a MEMS pressure transducer 520. The MEMS pressure transducer 520 is optional. However, when used, the MEMS pressure transducer 520 is configured to sense the pressure profile of the control signal from the pilot/regulating valve 516. The controller 322, or other control device, is configured to receive input from the MEMS pressure transducers 520 and to provide output to the MEMS microvalve 100 in the pilot valve 512 to regulate the system pressure in response to input from one of the MEMS pressure transducers 520. Therefore, the MEMS pressure transducer 520 provides closed-loop feedback and adjustment of the control signal sent to the hydraulically-controlled component 510.

The hydraulically-controlled component 510 may be the SOWC 312 including the SOWC actuator 314 configured as shown in FIGS. 3B and 3C, or may be a differently configured SOWC and/or differently configured SOWC actuator. For example, and without limitation, the control signal from the pilot/regulating valve 516 may be sent directly to the SOWC actuator 314 through the control line 346 (as illustrated in FIG. 3B). Alternatively, the control signal sent to the hydraulically-controlled component 510 may be adjusted by the MEMS pressure transducer 520 such that the control signal may also be used to control the piston and spring positions in the actuator 314 to maintain the shift lever 340 in an intermediate position corresponding to a selected operating mode of the SOWC 312. In this alternative, the pressure transducer 520 may be configured as a pressure switch 520 to enable the actuation of an intermediate position of the shift lever 340 and the corresponding operating mode of the SOWC 312. In either configuration, the SOWC actuator 314 controls engagement and disengagement of the selectable one-way clutch 312 based upon the control signal from the pilot/regulating valve 516.

Figure 6:
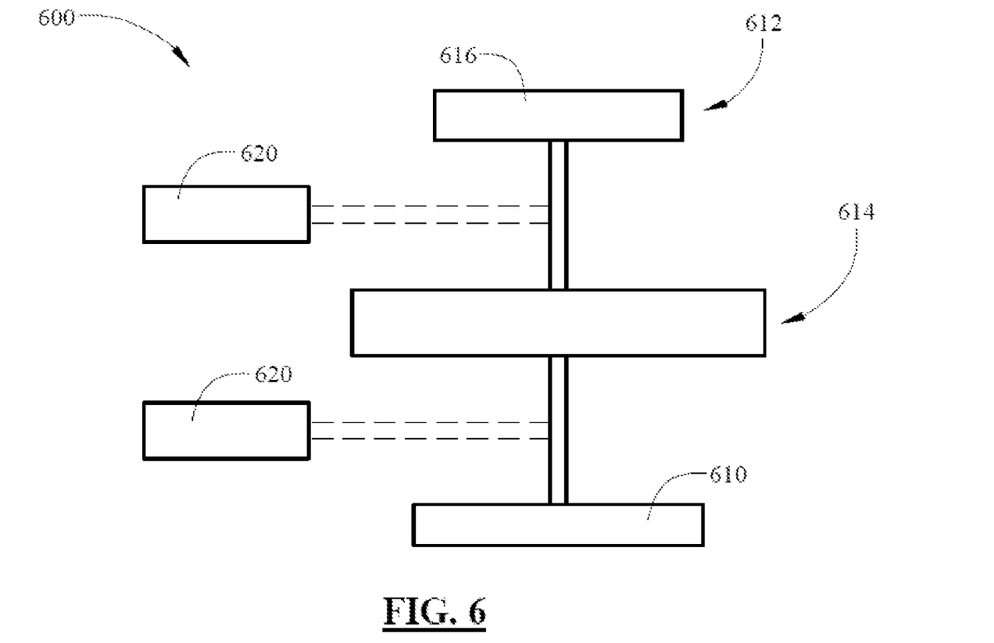
FIG. 6 is a schematic box diagram of a third option for a pressure control system for the hydraulically-controlled component within the powertrain.

FIG. 6 shows a third option 600 for a pressure control system for a hydraulically-controlled component 610 within the powertrain of the vehicle 300 including the transmission 304. The hydraulically-controlled component 610 may be the SOWC 312 including the SOWC actuator 314 configured as shown in FIGS. 3B and 3C, or may be a differently configured SOWC and/or differently configured SOWC actuator. The third option 600 includes a pilot valve 612 controlling a regulating valve 614. The regulating valve 614 is in fluid communication with the pilot valve 612.

The pilot valve 612 includes a first valve 616 producing a pilot signal. The regulating valve 614 is configured to receive the pilot signal and the regulating valve 614 is configured to output a control signal, which controls the hydraulically-controlled component 610.

In the third option 600 shown in FIG. 6, the first valve 616 may include the MEMS microvalve 100 shown in FIG. 1, but there is no second valve forming the pilot valve 612. Therefore, unlike the first option 400 shown in FIG. 4, the MEMS microvalve 100 communicates the pilot signal directly to the regulating valve 616, which is a small mechanical spool valve.

Generally, the small mechanical spool valve is a regulating valve produced by mechanical machining processes, as opposed to the micromachining processes used to produce MEMS-based devices, but on a smaller scale than the conventional mechanical regulating valve. Based upon the (un-amplified) pilot signal provided by the pilot valve 612, the small mechanical spool valve provides the control signal for the hydraulic-actuated component 610. Compared to the conventional mechanical regulating valve which will be described for the option 700 shown in FIG. 7, the small mechanical spool valve is, for example, on the order of half the size of the conventional mechanical regulating valve included in the option 700.

The pilot signal produced by the pilot valve 612 (including only the MEMS microvalve 100) may have sufficient pressure and flow characteristics to control the small mechanical spool valve used for the regulating valve 616 with relatively quick response times. However, while the MEMS microvalve 100 alone may be capable of directly controlling the hydraulically-controlled component of the second option 500, the response times for actuation may be delayed. The small mechanical spool valve may be used to amplify the signal from the MEMS microvalve 100, and the small mechanical spool valve may control the hydraulically-controlled component 610.

The third option 600 may further include one or more optional MEMS pressure transducers 620. However, when used, the MEMS pressure transducers 620 are configured to sense the pressure profile of pilot signal from the pilot valve 612 or of the control signal from the regulating valve 614. In most configurations, only one of the MEMS pressure transducers 620 will be used. If used to sense the pressure profile of the pilot signal, the MEMS pressure transducer 620 may be packaged into a single package along with the MEMS microvalve 100 for the pilot valve 612.

The controller 322, or another controller, is configured to receive input from one of the MEMS pressure transducers 620 and to provide output to the MEMS microvalve 100 in the pilot valve 612 to regulate the system pressure in response to input from one of the MEMS pressure transducers 620. Therefore, the MEMS pressure transducers 620 provide closed-loop feedback and adjustment of the control signal sent to the hydraulically-controlled component 610.

The hydraulically-controlled component 610 may be the SOWC 312 including the SOWC actuator 314 configured as shown in FIGS. 3B and 3C, or may be a differently configured SOWC and/or differently configured SOWC actuator. For example, and without limitation, the control signal from the regulating valve 614 may be sent directly to the SOWC actuator 314 through the control line 346 (as illustrated in FIG. 3B). Alternatively, the control signal sent to the hydraulically-controlled component 610 may be adjusted by the MEMS pressure transducer 620 such that the control signal may also be used to control the piston and spring positions in the actuator 314 to maintain the shift lever 340 in an intermediate position corresponding to a selected operating mode of the SOWC 312. In this alternative, the pressure transducer 620 may be configured as a pressure switch 620 to enable the actuation of an intermediate position of the shift lever 340 and the corresponding operating mode of the SOWC 312. In either configuration, the SOWC actuator 314 controls engagement and disengagement of the selectable one-way clutch 312 based upon the control signal from the regulating valve 614, which is produced in response to the pilot signal from the pilot valve 612.

Figure 7:
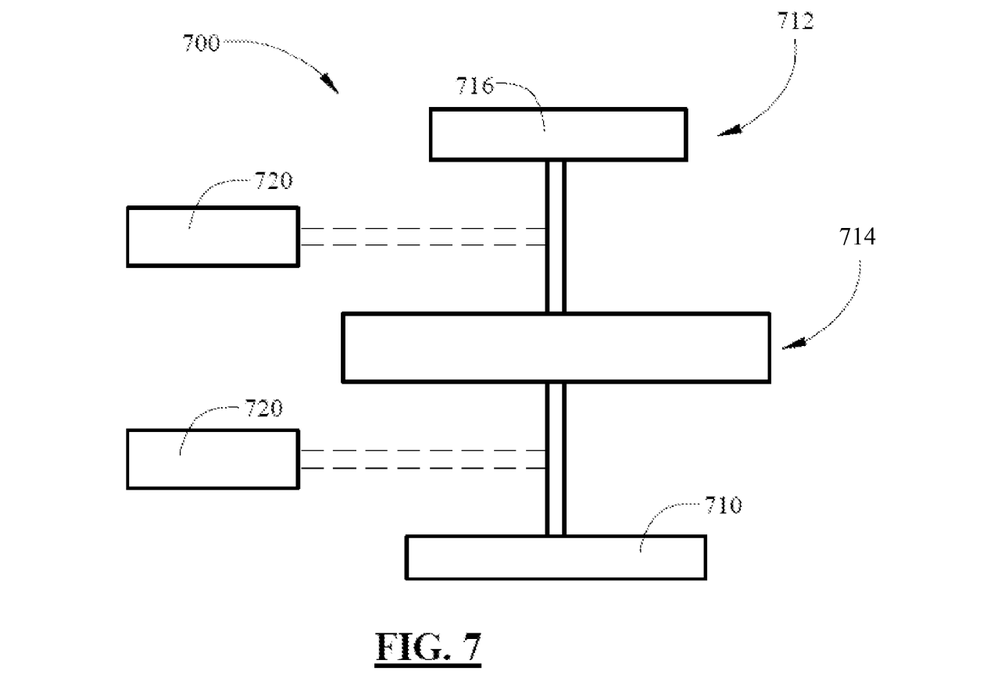
FIG. 7 is a schematic box diagram of a fourth option for a pressure control system for the hydraulically-controlled component within the powertrain.

FIG. 7 shows a fourth option 700 for a pressure control system for a hydraulically-controlled component 710 within the powertrain of the vehicle 300 including the transmission 304. The hydraulically-controlled component 710 may be the SOWC 312 including the SOWC actuator 314 configured as shown in FIGS. 3B and 3C, or may be a differently configured SOWC and/or differently configured SOWC actuator. The fourth option 700 includes a pilot valve 712 controlling a regulating valve 714. The regulating valve 714 is in fluid communication with the pilot valve 712.

The pilot valve 712 includes a first valve 716 producing a pilot signal. The regulating valve 714 is configured to receive the pilot signal and the regulating valve 714 is configured to output a control signal, which controls the hydraulically-controlled component 710.

In the fourth option 700 shown in FIG. 7, the first valve 716 may include the MEMS microvalve 100 shown in FIG. 1, and, similar to the third option 600, there is no second valve forming the pilot valve 712. Therefore the MEMS microvalve 100 communicates the pilot signal directly to the regulating valve 716, which is a conventional mechanical regulating valve.

Generally, the conventional mechanical regulating valve is a regulating valve produced by mechanical machining processes, as opposed to the micromachining processes used to produce MEMS-based devices. Based upon the (un-amplified) pilot signal provided by the pilot valve 712, the conventional mechanical regulating valve provides the control signal for the hydraulic-actuated component 710. Compared to the small mechanical spool valve described for the option 600 shown in FIG. 6, the conventional mechanical regulating valve included in option 700 is, for example, on the order of twice the size of the small mechanical spool valve included in the option 600.

The pilot signal produced by the pilot valve 712 (including only the MEMS microvalve 100) may have sufficient pressure and flow characteristics to control the conventional mechanical regulating valve used for the regulating valve 716, with relatively quick response times. The conventional mechanical regulating valve may be used to amplify the signal from the MEMS microvalve 100, the conventional mechanical regulating valve may control the hydraulically-controlled component 710.

The fourth option 700 may further include one or more optional MEMS pressure transducers 720. However, when used, the MEMS pressure transducers 720 are configured to sense the pressure profile of pilot signal from the pilot valve 712 or of the control signal from the regulating valve 714. In most configurations, only one of the MEMS pressure transducers 720 will be used. If used to sense the pressure profile of the pilot signal, the MEMS pressure transducer 720 may be packaged into a single package along with the MEMS microvalve 100 for the pilot valve 712.

The controller 322, or another controller, is configured to receive input from one of the MEMS pressure transducers 720 and to provide output to the MEMS microvalve 100 in the pilot valve 712 to regulate the system pressure in response to input from one of the MEMS pressure transducers 720. Therefore, the MEMS pressure transducers 720 provide closed-loop feedback and adjustment of the control signal sent to the hydraulically-controlled component 710.

The hydraulically-controlled component 710 may be the SOWC 312 including the SOWC actuator 314 configured as shown in FIGS. 3B and 3C, or may be a differently configured SOWC and/or differently configured SOWC actuator. For example, and without limitation, the control signal from the regulating valve 714 may be sent directly to the SOWC actuator 314 through the control line 346 (as illustrated in FIG. 3B). Alternatively, the control signal sent to the hydraulically-controlled component 710 may be adjusted by the MEMS pressure transducer 720 such that the control signal may also be used to control the piston and spring positions in the actuator 314 to maintain the shift lever 340 in an intermediate position corresponding to a selected operating mode of the SOWC 312. In this alternative, the pressure transducer 720 may be configured as a pressure switch 720 to enable the actuation of an intermediate position of the shift lever 340 and the corresponding operating mode of the SOWC 312. In either configuration, the SOWC actuator 314 controls engagement and disengagement of the selectable one-way clutch 312 based upon the control signal from the regulating valve 714, which is produced in response to the pilot signal from the pilot valve 712.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A pressure control system for a selectable one-way clutch (SOWC) comprising:
    a MEMS pilot microvalve configured to output an unamplified pilot signal to a mechanical regulating valve;
    the mechanical regulating valve configured to receive the unamplified pilot signal from the MEMS pilot microvalve and to output a control signal; and
    a SOWC actuator configured to engage and disengage the SOWC in response to the control signal.

2. The pressure control system of claim 1, wherein the mechanical regulating valve is a small mechanical spool valve.

3. The pressure control system of claim 1, further including a MEMS pressure transducer, wherein the MEMS pressure transducer is configured to sense a pressure profile of the control signal output from the mechanical regulating valve.

4. The pressure control system of claim 3, further including a controller, wherein the controller is configured to receive an input from the MEMS pressure transducer and to provide an output to the pilot valve to regulate one of the pilot signal and the control signal in response to the input received from the MEMS pressure transducer.

5. The pressure control system of claim 4,
    wherein the controller is configured to provide an electronic current to the pilot valve; and
    wherein the pilot valve is configured to produce the pilot signal in response to the electronic current.

6. The pressure control system of claim 5, wherein the SOWC actuator is configured to select between three operating modes of the selectable one-way clutch in response to the pilot signal.

7. The pressure control system of claim 1, further including a MEMS pressure transducer, wherein the MEMS pressure transducer is configured to sense a pressure profile of the unamplified pilot signal.

8. The pressure control system of claim 7, further including a controller configured to receive an input from the MEMS pressure transducer and to provide an output to the pilot valve, wherein the output is configured to regulate the pilot signal in response to the input received from the MEMS pressure transducer.

9. The pressure control system of claim 8, wherein the SOWC actuator is configured to select between at least two operating modes of the selectable one-way clutch in response to the pilot control signal.

10. The pressure control system of claim 1, wherein the mechanical regulating valve is configured to amplify the unamplified pilot signal and to output an amplified pilot signal as the control signal.

11. The pressure control system of claim 10, further comprising:
    a pressure switch comprising a MEMS pressure transducer configured to adjust the control signal.

12. The pressure control system of claim 1, further comprising:
    a MEMS pressure transducer configured to sense a pressure profile of the control signal output from the mechanical regulating valve.

13. The pressure control system of claim 12, wherein the MEMS pressure transducer is configured as a MEMS pressure switch to maintain the SOWC in a selected operating mode.

14. The pressure control system of claim 12, wherein the pressure switch is actuable to maintain a shift element of the SOWC in an intermediate position corresponding to a third operating mode of the SOWC.

15. A powertrain in a vehicle, the powertrain comprising:
    a transmission including a selectable one-way clutch (SOWC); and
    a pressure control system configured to control the SOWC, the pressure control system including:
        a MEMS pilot microvalve configured to output an unamplified pilot signal to a mechanical regulating valve;
        the mechanical regulating valve configured to receive the unamplified pilot signal from the MEMS pilot microvalve, to amplify the unamplified pilot signal, and to output the amplified pilot signal as a control signal; and
        a SOWC actuator configured to engage and disengage the SOWC in response to the control signal.

16. The powertrain of claim 15, wherein the pressure control system includes a MEMS pressure transducer configured to sense a pressure profile of the unamplified pilot signal, the powertrain further including:
    a controller configured to receive an input from the MEMS pressure transducer and to provide an output to the pilot valve, wherein the output is configured to regulate the unamplified pilot signal in response to the input received from the MEMS pressure transducer; and
    wherein the SOWC actuator is configured to select between at least two operating modes of the selectable one-way clutch in response to the pilot signal.

17. The powertrain of claim 15, wherein the pressure control system further comprises:
    a MEMS pressure transducer configured to sense a pressure profile of the control signal.

18. The powertrain of claim 15, wherein the pressure control system further comprises:

a pressure switch comprising a MEMS pressure transducer configured to adjust the control signal.

19. The powertrain of claim 15, the pressure control system further comprising:
a pressure switch comprising a MEMS pressure transducer;
wherein the pressure switch acts on the control signal outputted from the regulating valve to maintain a shift element of the SOWC in an intermediate position corresponding to an operating mode of the SOWC.

* * * * *